US010637285B2

(12) United States Patent
Bell

(10) Patent No.: US 10,637,285 B2
(45) Date of Patent: Apr. 28, 2020

(54) CONTROL METHOD AND APPARATUS

(71) Applicant: TEMPUS ENERGY LIMITED, Reading, Berkshire (GB)

(72) Inventor: Sara Bell, London, Greater London (GB)

(73) Assignee: TEMPUS ENERGY LIMITED, Reading, Berkshire (GB)

(*) Notice: Subject to any disclaimer, the term of this patent is extended or adjusted under 35 U.S.C. 154(b) by 143 days.

(21) Appl. No.: 15/545,498

(22) PCT Filed: Jan. 20, 2016

(86) PCT No.: PCT/GB2016/050114
§ 371 (c)(1),
(2) Date: Jul. 21, 2017

(87) PCT Pub. No.: WO2016/116743
PCT Pub. Date: Jul. 28, 2016

(65) Prior Publication Data
US 2018/0013321 A1 Jan. 11, 2018

(30) Foreign Application Priority Data

Jan. 21, 2015 (GB) .................................. 1501028.3
Nov. 5, 2015 (GB) .................................. 1519566.2

(51) Int. Cl.
*G06F 19/00* (2018.01)
*H02J 13/00* (2006.01)
(Continued)

(52) U.S. Cl.
CPC .......... *H02J 13/0006* (2013.01); *G05B 15/02* (2013.01); *G06Q 40/12* (2013.12);
(Continued)

(58) Field of Classification Search
CPC ........ G05B 15/02; G06Q 40/12; G06Q 50/06; H02J 13/0006; H02J 3/008;
(Continued)

(56) References Cited

U.S. PATENT DOCUMENTS 3,872,286 A 3/1975 Putman
6,633,823 B2 * 10/2003 Bartone .................... H02J 3/14
700/295
(Continued)

FOREIGN PATENT DOCUMENTS

GB 8501851 4/1985

OTHER PUBLICATIONS

International Search Report for PCT/GB2016/050114, Completed by the European Patent Office dated May 3, 2016, All together 4 Pages.
(Continued)

*Primary Examiner* — Kidest Bahta
(74) *Attorney, Agent, or Firm* — Brooks Kushman P.C.

(57) ABSTRACT

A method of controlling at multiple customer sites with separate metering electrical devices to control consumption of electricity in an electricity supply web made up of multiple electricity using customers that is over laid on a physical network, comprising the steps of: acquiring a budget for electrical energy for use in a predetermined time period; monitoring real-time use of electrical energy by electrical devices in the overlay web; comparing real-time use of electrical energy with the budget; and sending a control signal to at least one electrical device in the overlay web, based on the comparison, in order to increase or decrease electrical load so that total energy use in the predetermined time period is balanced with the budget. Also disclosed is an apparatus for controlling at least one elec-
(Continued)

trical device in an electricity supply web made up of multiple electricity using customers.

17 Claims, 6 Drawing Sheets

(51) Int. Cl.
*H02J 3/14* (2006.01)
*G06Q 40/00* (2012.01)
*G05B 15/02* (2006.01)
*G06Q 50/06* (2012.01)
*H02J 3/00* (2006.01)

(52) U.S. Cl.
CPC ............... *G06Q 50/06* (2013.01); *H02J 3/14* (2013.01); *H02J 3/008* (2013.01); *H02J 2003/003* (2013.01); *H02J 2003/146* (2013.01); *Y02B 70/3225* (2013.01); *Y02B 70/3266* (2013.01); *Y02P 90/90* (2015.11); *Y04S 20/222* (2013.01); *Y04S 20/224* (2013.01); *Y04S 20/242* (2013.01); *Y04S 50/10* (2013.01)

(58) Field of Classification Search
CPC ........... H02J 2003/003; H02J 2003/146; Y04S 10/54; Y02B 70/3225; Y02B 70/3266
See application file for complete search history.

(56) References Cited

U.S. PATENT DOCUMENTS

| | | | |
|---|---|---|---|
| 6,959,500 B2* | 11/2005 | Liao | G01B 3/1082 33/755 |
| 7,233,846 B2* | 6/2007 | Kawauchi | G01M 15/00 701/33.8 |
| 8,417,391 B1 | 4/2013 | Rombouts et al. | |
| 8,433,801 B1* | 4/2013 | Yemini | G06Q 10/06 709/226 |
| 9,805,345 B1* | 10/2017 | Dailianas | G06Q 20/102 |
| 2002/0072868 A1* | 6/2002 | Bartone | H02J 3/14 702/62 |
| 2007/0203860 A1 | 8/2007 | Golden et al. | |
| 2010/0138363 A1* | 6/2010 | Batterberry | G06Q 10/04 705/412 |
| 2011/0093125 A1 | 4/2011 | Schoeman et al. | |
| 2011/0161251 A1* | 6/2011 | Carey | G06Q 10/06 705/412 |
| 2012/0065792 A1 | 3/2012 | Yonezawa et al. | |

OTHER PUBLICATIONS

Great Britain Search Report for Application No. GB 1501028.3, dated Mar. 16, 2015, 1 Page.
Great Britain Search Report for Application No. GB 1519566.2, dated Apr. 29, 2016, 1 Page.

* cited by examiner ial and commercial users. They rely on
electricity for a variety of uses, e.g. light, heating, household
equipment, manufacturing, etc. Customers' usage of electricity is known as electricity "demand" and any action that
takes place at the point of the customers' premises is known
as "demand-side". Conversely, any action that takes place
elsewhere in the supply chain is referred to as "supply-side".
All customers have time-critical electricity needs (e.g. turning on the lights when the sun sets) and non-time critical
needs (e.g. turning on a dishwasher or washing machine).

The Balancing of Electrical Power

For all practical purposes, electricity cannot yet be stored
economically in large quantities. In order to ensure stability
in the network, a stable relationship must be achieved
between the power generated and the power that is used. If
this stability is comprised, frequency losses (and therefore
blackouts) occur, which can have severe social and economic consequences. Therefore it is important, in order to
meet societal demands for security of supply, to ensure that
a sufficient quantity of the right kinds of electricity production capacity is always available to serve demand at the
moment that demand exists.

Generators calculate how much power to produce in a
given period by cross-referencing with the amount of power
that has been purchased by suppliers. In the UK, purchased
electricity is valid for use in a specific future time period,
called a "settlement period", which lasts 30 minutes. The
settlement period is different in other countries.

When then there is an over supply of electricity outside of
peak times, this electricity must be prevented from accessing
the grid (i.e. "constrained off") to avoid frequency collapse.
Where this electricity generation is sourced from renewable
technologies, such as an abundance of onshore wind on the
system at night, this leads to clean (and inexpensive) energy
being wasted.

Such waste in turn makes it harder for intermittent renewable developers to secure a predictable route-to-market,
which adversely affects investment. It also forces developers
into long-term bilateral supply contracts (through which a
route-to-market is guaranteed, at a price), reducing individual renewable project profitability and causing wider
wholesale electricity market illiquidity, which further exasperates the route-to-market problem for renewables.

Electricity supply companies generally contract for electricity in advance. At the end of each settlement period, a
review is performed to assess whether the amount of electricity consumed was equal to the amount procured, and
suppliers are typically penalised for any imbalance. However, penalties are more severe where there has been an
over-use of electricity, since this would be catastrophic for
the physical network if all utility companies over-used at the
same time. For this reason, suppliers often contract for more
electricity than they are likely to require, which again is a
wasteful process. The resulting oversupply of electricity on
the network must be managed by the System Operator
responsible for ensuing security of supply. The cost of
dealing with all inefficiencies across the supply chain is
ultimately borne by customers.

Demand-Side Flexibility

The balance on the electricity network can be improved
by measures implemented on the demand-side. Such measures include energy efficiency/reduction and also demand
flexibility, which moves consumption into different time
periods, without necessarily reducing the overall consumption. By shifting energy demand out of "peak time" periods
when supply is tight relative to demand and into periods

CONTROL METHOD AND APPARATUS

CROSS-REFERENCE TO RELATED APPLICATION

This application is the U.S. national phase of PCT Application No. PCT/GB2016/050114 filed on Jan. 20, 2016, which claims priority to GB Patent Application No. 1501028.3 filed on Jan. 21, 2015, and to GB Patent Application No. 1519566.2 filed on Nov. 5, 2015, the disclosures of which are incorporated in their entirety by reference herein.

This invention relates to an electricity management web that enables concurrent control of electricity consumption and provision across an electricity supplier's ecosystem, in order to 5 increase efficiency across the supply chain and utilise renewable energy that would otherwise be wasted, by optimising multiple customers at the same time.

BACKGROUND EXPLANATION

Electricity Systems

In an electricity system there are four major types of body or roles to be undertaken: (i) 10 generators (ii) suppliers (iii) network/system operators and (iv) customers.

In terms of electricity generation, there is baseload, peaking and intermittent generation.

Baseload generating stations are production facilities with low operating costs but also little operational flexibility, which tend to be run at or near their full output for extended periods of time. Nuclear and coal plant are common baseload generators.

Peaking generators are characterised by very flexible plant with high operating costs that can generate electricity at short notice when directed to do so, but tend to be operated only during hours of unusually high demand or unusually low supply. Open-cycle gas turbine-generators and diesel generators are common examples. Peaking plant is typically expensive and carbon-intensive.

Intermittent generators' availability is determined largely by factors outside the direct control of their operators. Therefore, they cannot guarantee to be in a position to meet a given quantity of demand at a specific time. Instead, they tend to produce power when conditions are right (e.g. the weather). Renewable energy sources such as wind and solar power have become increasingly important, in light of climate change mitigation policies. However, decarbonisation of the electricity system is currently limited by the intermittent nature of these technologies, which makes them costly and unreliable, in the present system set-up.

Generators do not deliver electricity directly to customers. Instead, suppliers are responsible for providing energy within their own customer nexus, using a supply-chain web. Each supplier's own supply web is overlaid on the total physical grid; therefore they may be referred to as "overlay webs".

Suppliers make arrangements for the delivery of electricity onto the physical networks and to their respective customers' premises. They do this by contracting with generators (in addition to purchasing electricity in the market place via an exchange), contracting with the owners of the electric lines (network owners) and also entering into an arrangement with the national System Operator (SO), which has a responsibility to oversee all of the physical flows across the entire grid.

Electricity customers range from domestics to small business and large industr when supply is plentiful relative to demand, demand flexibility facilitates the physical balancing of energy demand and supply, in a particularly cost-efficient way.

Demand flexibility is currently used by demand "aggregators", which enter into arrangements with (usually) industrial and commercial customers, under which the customer agrees to be flexible in the consumption of their non-time critical electricity at a particular time period. Each aggregator subsequently calculates the total capacity available from all of the flexible users it has contracted with at any one time. That physical capacity can then be offered to the System Operator, in exchange for a payment, which the aggregator passes back to the flexible customer, whilst retaining a small profit margin for itself.

Presently, demand flexibility is largely unattainable for small business and domestic customers, which have neither the time nor sectorial understanding to play an active role in their consumption variation, as required by a demand aggregator, whilst separately arranging for supply of electricity from an electricity supplier. At the same time, technical limitations mean that it is difficult for supply companies to balance actual use of electrical energy with contracted supply in a settlement period because they have no control and limited visibility of their customers' electricity usage.

However, if the currently inflexible sections of the demand-side could be made more flexible, the imbalances between supply and demand in the network could be reduced. This would in turn reduce the carbon intensity of the electricity grid.

Creating a flexible demand-side would enable the whole system to accommodate much more renewable intermittent generation, whilst avoiding an increase in imbalance costs, reducing the need to invest in future fossil-fuel generation capacity. Lowering the imbalance risk associated with renewable generators would enabling such generators to sell their power closer to the wholesale market price, reducing the need for public subsidies for renewables.

Demand flexibility can be used as an alternative to peaking generation. As well as reducing carbon emissions, this also avoids the problem of physical network losses (a certain amount of electricity is always wasted when it is conveyed over long distances) in most of the network areas. It can also ease congestion on the network. In the longer term, this means that the network does not need as many costly reinforcements.

The applicant has developed an electricity management web that can be used by an electricity supplier to drive efficiency simultaneously at multiple points within its overlay web.

The invention proactively manages the electricity usage of customers in multiple sites, each with separate metering that has a flexible load (e.g., storage heating, heat pumps with storage, electric vehicles and non-time critical industrial processes). The invention uses automated smart technology to shift multiple customers' usage away from expensive times of peak demand and into times when energy is cheap and plentiful, such as periods where there is an excess of wind power on the system or during the night.

This allows more efficient electricity provision on customers' behalf, without the customer needing to actively manage their appliances or track energy prices. In addition to allowing new categories of flexible customers to access the upside of demand-flexibility, the invention also introduces the wider system benefits of enabling renewable energy to be utilised where possible, and reducing imbalance costs to the advantage of all customers (including inflexible customer and those with other suppliers).

The result of these effects is shown in FIG. 6.

Object and Operation of the Invention

An object of the present invention is to provide an apparatus and method that can make it easier for electricity supply companies to balance actual use of electrical energy with an energy budget in a settlement period. Thus, the object of the invention is to improve the physical and environmental efficiency of an electrical network by matching supply and demand more effectively at the overlay web.

According to the present invention there is provided a method of controlling multiple electrical devices at multiple customer sites with separate metering in order to control consumption of electricity in an electricity supply network that is overlaid on a physical network, comprising the steps of: acquiring a budget for electrical energy for use in a predetermined time period for multiple customers aggregated together; monitoring real-time use of electrical energy by electrical devices at multiple customer sites simultaneously in the overlay web; comparing real-time use of electrical energy with the budget in aggregate; and sending a control signal to multiple customer sites with separate metering and electrical devices in the overlay web, based on the comparison, in order to increase or decrease electrical load so that total energy use in the predetermined time period is balanced with the budget.

In this way active control of an overlay web can be achieved to optimise electrical use according to physical supply conditions. In many circumstances it is desirable to balance actual use of electrical energy with an energy budget, which will typically correspond to an amount of energy that has been purchased in advance for use in a predefined time period by MCSWSM; the energy will typically have been purchased from an electricity supply market where the sellers are the companies that generate energy to the physical network. By balancing the energy used with the energy budget it is possible for electricity generation to be optimised; this reduces the risk of outages caused by over demand of electricity and also reduces the wastage caused by under demand. Electricity generation companies are therefore better able to determine how much energy they should generate, and renewable generators can ensure that all of their clean output is utilised. This is advantageous as it reduces waste caused by oversupply in an electrical network. In turn this can reduces carbon emissions and electricity system cost.

It may not always be possible to achieve precise equality between the total energy use and the budget in the time period. The electrical devices are preferably controlled in order to achieve the best balance that is possible, given the flexibility in the overlay web at MCSWSM.

The predetermined time period may be the electricity settlement period. In many countries this is the time period for which electricity may be bought in the wholesale generation market. Thus, if electricity is purchased from the wholesale generation market then this will typically be valid only during a settlement period with a specific start time. In the UK the electricity settlement period is 30 minutes.

Preferably the method also comprises the steps of monitoring multiple customers real-time parameters related to the amount of excess energy in the physical network; determining whether at least one parameter exhibits predefined characteristics indicative of over use of electrical energy in the physical network; and sending a control signal to multiple customer sites with separate metering electrical devices in the overlay web in order to reduce electrical load on the physical network if there is an indication of over use of electrical energy.

It is important to distinguish between the overlay web, which supplies electricity to customers who have contracted to receive energy, and the physical network which includes all users, including other companies' customers. Electrical devices in the overlay web may be controlled based on parameters of the physical network in order to avoid over use or under use in the physical network. This control may be independent of the comparison between real-time use of electrical energy and the budget.

If there is an over use of electricity in the physical network then the rate of supply may be only slightly higher than the rate of demand. This is an unstable situation for the physical network because it would be vulnerable to collapse if the situation were to change such that demand exceeded supply. It may be possible to identify this condition by detecting an increase in price for the commodity, or some other factor such as a change in physical network frequency. The trigger for this could be an event such as a generator being tripped. The trigger could also be a peak in demand; infrequent peaks in demand can occur during popular events such as televised football matches or during cold snaps where many electrical devices demand energy at the same time. If such a condition is detected then it is desirable to minimise unnecessary load on the physical network in order to improve environmental efficiency. This reduces the risk of outages in the physical network. It also reduces the need to generate additional electrical energy at short notice, which reduces carbon emissions and cost for users. This can also reduce demand on the physical network which could otherwise find itself at capacity.

In some circumstances it may be possible to reduce load on the physical network for a short period and then operate electrical devices in the remainder of the predetermined time period in order to balance energy use with the budget. In other circumstances the condition may be such that it is more energy and cost efficient to shed load such that there is an imbalance between the physical energy used and the energy budget. Although such an imbalance is normally undesirable it may be preferable during extreme conditions to reduce demand on the physical network allowing for users in other overlay webs increasing their electricity demand.

Preferably the method comprises the further steps of determining whether at least one real-time parameter exhibits predefined characteristics indicative of under use of electrical energy in the physical network; and sending a control signal to multiple customer sites with separate metering electrical devices in the overlay web in order to increase electrical load if there is an indication of under use of electrical energy.

An under use of electricity in the physical network could be caused by a sudden increase in energy generation by renewable sources such as solar or wind. Under use of electricity in the physical network is undesirable because excess energy is typically wasted, reducing the environmental advantage of renewable sources. Under use can also create undesirable pressure on the physical network which can disrupt the stable physical network frequency if it is not managed correctly. By increasing the electrical load when there is an under use condition it is possible to take advantage of renewable energy when it is available. This improves the efficiency of the renewable sources because it is possible to reduce the load at other times when renewable sources are not available. Consequently these techniques can decrease the impact of energy generation on the environment.

An over use condition may be detected if the real-time price of electricity exceeds a predetermined threshold and/or if the frequency of the electricity in the network is above or below respective predetermined values. An under use of electricity in the physical network may be detected if the real-time price drops below a predetermined threshold. In some countries drastic under use is determined by negative pricing and such pricing may exist during these under use conditions.

Real-time price may be a useful metric for determining whether there is an over-use or an under-use condition in the physical network. However, it is important to recognise that price is simply used as a useful shorthand indicator for real world physical properties of the physical network. Typically price is influenced by the power supply to the physical network, the total load on the physical network and the frequency and physical network capacity. Some physical networks have real pricing, however some do not which is why frequency is used as a measure of under/over use. It would be possible to determine over-use or under-use by direct measurement of these parameters.

A plurality of electrical devices at multiple customer sites with separate metering may be controlled based on the real-time use of electrical energy by devices in the overlay web, and each electrical device may have a permitted flexibility in the timing and capacity of its use. In one example a controllable device may be a heater for a swimming pool. In this example the permitted flexibility may be such that the heater must be used for between 0-2 hours per day with no constraints on the time of day in which use can occur. The swimming pool heater can therefore be controlled, together with other electrical devices MCSWSM, in order to balance total energy use in the overlay web with an electrical energy budget.

In another example the controllable device may be used in an industrial process which must be used for 30 minutes between 01:00 hr and 06:00 hr. The device can therefore be controlled to balance total energy use in the overlay web with an electrical energy budget. Alternatively the controllable device can be switched on if an under use condition is detected in the physical network, or it can be switched off if an over use condition is detected. This is repeated at MCSWSM.

Preferably a large number of electrical devices are provided at MCSWSM. This provides a great deal of flexibility in the power consumption of the overlay web at any given time.

The overlay web may include other electrical devices which cannot be controlled directly in order to balance energy use with a budget in the overlay web. For these electrical devices it is typically not appropriate to delegate control signals to an electricity supplier. Many examples of these devices can be found in a domestic environment; typically domestic appliances are operated at a time that is convenient to the home owner, rather than a time that is convenient to a network control unit. Consumption from these devices will still be included in the total consumption of the overlay web.

Each of the plurality of electrical devices may have a maximum allowable switching frequency. Preferably this is set to avoid damage to the device and/or to improve efficiency. "Fast" switching devices are typically those that can tolerate a short time period between switch-on and switch-off signals (or increase/shed load commands where there is analogue control). An example of a fast device may be an air conditioning unit. On the other hand for "slow" switching devices there must be a comparatively long periods between switch-on and switch-off signals. Typically it is better to control fast devices at the beginning of the time period. This is advantageous because control of fast devices can be reversed if there are signs of a natural correction to an imbalance between energy used and an energy budget. Typically slow devices also have a larger energy use so these devices can have a greater impact in correcting any imbalance.

Control signals may be sent preferentially in a later portion of the predetermined time period in comparison to an earlier portion of the predetermined time period. It is generally preferable to avoid interference at customer sites in the overlay web, and therefore the number of control signals is minimised. Towards the end of the time period, however, it is less likely that an imbalance will be corrected naturally. Therefore, targeted corrections occur may occur more often towards the end of the time period using appropriate control signals.

The predetermined time period may be divided in at least two portions and different rules for sending control signals are applied in the respective portions. In one example the predetermined time period is 30 minutes and this is divided into two minute portions. In the first 15 minutes comparatively few control signals are sent if there is an imbalance in the overlay web because there may be some variation in predicted customer consumption in real time. More targeted control signals may be sent in the second 15 minute period in order to correct any imbalance in the overlay web.

Control signals may be sent to a plurality of electrical devices, which may be an electrical storage device, wherein the electrical storage device can receive a control signal in order to increase or decrease electrical load. The electrical storage device can therefore add flexibility to the overlay web. If an additional load is required, either to balance energy used with an energy budget, or to make use of an under use condition in the physical network, then a control signal can be sent to instruct the storage device to begin charging. Conversely the storage device can discharge electricity to the network if this is required for balancing or to assist the physical network in an over use condition. The electrical storage device may be a battery, a fly wheel, or some other device for storing and discharging electricity.

The physical network in a country is often divided into regional zones, which can be operated by different network operators. These regional zones can have different properties, and the electrical devices in the overlay web are preferably controlled in order to take advantage of differences in properties between different regions to create balance in the total network. Specifically, the method may include the step of analysing at least one property of the physical network in a plurality of geographic regions and selecting a geographic region with favourable properties. The step of sending the control signal may then involve sending the control signal to multiple customer sites with separate metering and electrical devices in the selected geographic region.

In one example, there may be relatively high demand on the physical network in a first region in comparison to a second region. In these circumstances it may be preferable to shed load preferentially in the first region and to increase load preferentially in the second region. The delivery infrastructure charges in the different regional zones may be a useful indicator in this regard. Thus, it may be advantageous to shed load preferentially in regions where the supply charges are relatively high and to increase load preferentially in regions where the supply charges are relatively low. The supply charges may be reflective of tangible factors in the physical network and these changes will help the total system at multiple customer sites with separate metering balance.

Preferably control signals are sent to electrical devices in order to decrease electrical load in one geographic region and increase electrical load in another geographic region according to favourable differences in properties between geographic regions. In this way it may be possible to re-distribute electrical load in different parts of a country, while still balancing total energy use with the budget in a settlement period.

Acquiring the budget may involve calculating an anticipated amount of electrical energy required in the overlay web in the predetermined time period based on consumption data for users of the overlay web. User consumption data can be used to indicate the likely amount of electricity that each user will require in a specific time period. This may be based on historical behaviour. In this way the budget may be an accurate reflection of the likely energy requirements in a settlement period.

The calculation of the anticipated amount of electrical energy required in the overlay web in the predetermined time period may also be based on one or more of: weather, user location, temperature, date, and a calendar of significant events. Any of these factors may influence the amount of energy that is likely to be required by users of the overlay web. For example, energy demands are likely to be higher on rainy days or when it is cold. Energy demands may also be influenced by the calendar; for example, there may be enhanced energy use on Christmas day or Thanksgiving in the United States. Energy demands may also be higher during important sporting or cultural events.

The calculation of the anticipated amount of electrical energy required in the overlay web in the predetermined time period may also be based on the permitted flexibility of use of electrical devices in the overlay web together with the price of electricity in the predetermined time period. The price of electricity is typically lower at night when the rate of supply is high in comparison to the rate of use. This is often at times of over supply of renewables. In these circumstances the budget can be set in order to take advantage of cleaner energy. Thus, the budget may be set higher than usual by taking account of the permitted flexibility in the timing of use of controllable devices at MCSWSM. Thus, the budget may be set on the assumption that certain controllable devices will be used at night time when energy is more plentiful. Again, it will be appreciated that price is used simply as a convenient shorthand for real-world parameters in the physical network.

The method may involve calculating an uncertainty factor for the anticipated amount of electrical energy required in the overlay web in the predetermined time period. The uncertainty factor may be important in determining how and whether to generate control signals for electrical devices. For example, if there is very low uncertainty in the anticipated amount of electrical energy required then only small differences would be tolerated between the budget and the total amount of energy used before corrective action is taken.

According to another aspect of the invention there is provided a method of determining a budget for electrical energy to be used in a predetermined time period comprising the steps of: calculating an anticipated amount of electrical energy that is required in aggregate at multiple customer sites with separate metering in an electricity supply web that is overlaid on a physical network in the predetermined time period; calculating a permitted flexibility in the anticipated amount; monitoring a parameter in the physical network related to the supply of and demand for electrical energy; and determining a budget for electrical energy based on the anticipated amount of electrical energy that is required, the permitted flexibility and the monitored parameter.

The monitored parameter may be the real-time price of electricity. In this way the budget can be set higher when the price is low. This can be done by taking advantage of the permitted flexibility in the overlay web. Flexible electrical devices can therefore be switched on when there is an excess of energy in the physical network in order to prevent wastage of this energy. By contrast, the budget can be set low when the price is high. This can be achieved by switching off flexible electrical devices to avoid placing unnecessary burden on the physical network.

According to yet another aspect of the invention there is provided an apparatus for controlling electrical devices at multiple customer sites with separate metering in an electricity supply web that is overlaid on a physical network, comprising: a processor configured to acquire a budget for electrical energy for use in a predetermined time period; a receiver configured to receive data relating to the real-time use of electrical energy by electrical devices in the overlay web, wherein the processor is configured to compare real-time use of electrical energy with the budget; and a transmitter configured to send a control signal to electrical devices at multiple customer sites with separate metering in the overlay web, based on the comparison, in order to increase or decrease electrical load so that total energy use in the predetermined time period is balanced with the budget.

According to a yet further aspect of the invention there is provided a non-transitory computer readable storage medium having a computer program stored thereon, the computer program comprising processor readable instructions that, when executed, direct a device to perform actions comprising: acquiring a budget for electrical energy for use in an electricity supply network that is overlaid on a physical network in a predetermined time period; monitoring real-time use of electrical energy by electrical devices at multiple customer sites with separate metering in the overlay web; comparing real-time use of electrical energy with the budget; and sending a control signal to at least one electrical device in the overlay web, based on the comparison, in order to increase or decrease electrical load so that total energy use in the predetermined time period is balanced with the budget.

According to yet another aspect of the invention there is provided a non-transitory computer readable storage medium having a computer program stored thereon, the computer program comprising processor readable instructions that, when executed, direct a device to perform actions comprising: calculating an anticipated amount of electrical energy that is required by multiple customer sites with separate metering in an electricity supply web that is overlaid on a physical network in the predetermined time period; calculating a permitted flexibility in the anticipated amount; monitoring a parameter related to the supply of and demand for electrical energy in the physical network; and determining a budget for electrical energy based on the anticipated amount of electrical energy that is required, the permitted flexibility and the monitored parameter.

Method features may be provided as corresponding apparatus features and vice-versa.

Embodiments of the present invention will now be described, by way of example only, with reference to the accompanying drawings in which.

Figure 1:
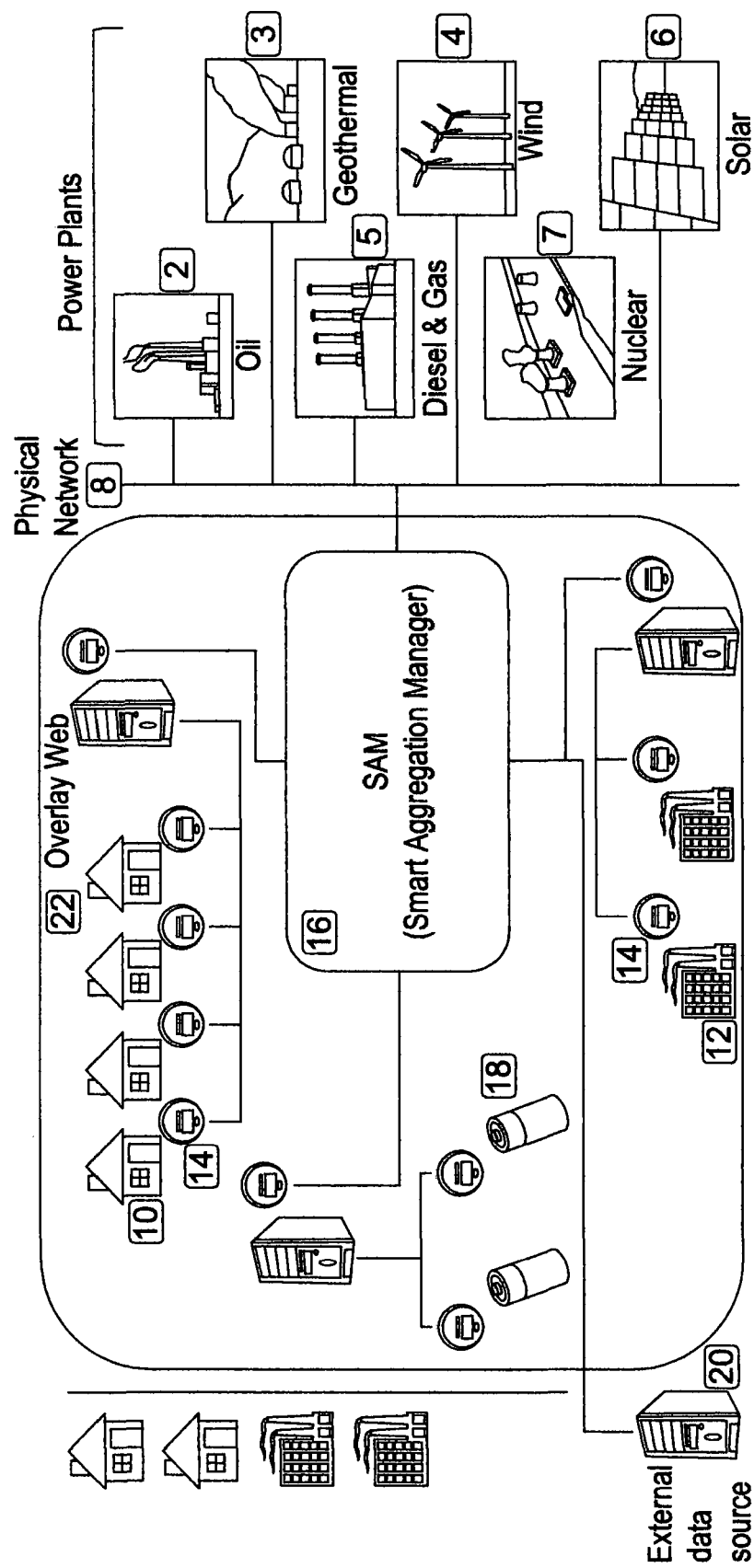
FIG. 1 is a schematic view of an electricity supply network, in an embodiment of the invention.

FIG. 1 is a schematic view of the various participants in an electrical supply chain. In this example electricity providers include an oil power station 2, wind turbines 4, an array of solar panels 6, a geothermal power plant 3, a fossil a gas power plant 5, and a nuclear power plant 7, all of which are connected to an electrical physical network 8. Several utility companies operate overlay webs within the physical network. Each utility company buys electricity from the providers and supplies it to their own customers. The utility company measures the amount of electricity used by its customers and bills them accordingly. In FIG. 1 an overlay web 22 is shown including a network controller 16, domestic customers 10 and commercial customers 12. The domestic and commercial customers 10, 12 have respective electricity meters 14 that report real-time use of electricity to the network controller 16 so that it can monitor their consumption of energy. The network also includes batteries 18 which are provided as an electrical storage unit within the network, linked to the physical network 8. An alternative or additional electrical storage unit is a fly wheel. The physical network 8 also supplies electricity to her domestic and commercial premises that are not part of the overlay web 22.

Various types of electric device are provided by the domestic and commercial customers 10, 12. Some of these devices are connected to the network controller 16 for direct control. These devices typically have flexibility in terms of the timing of their use such that it is possible to delegate control to the network controller 16 which is operated by the utility company running the overlay network. In one example a controllable device may be a heater for a swimming pool. Use of the heater is, of course, required to maintain water within specific temperature ranges, but it is not critical that the heater is used during specific time periods. Therefore, the network controller 16 can control the heater so that it is used during times that can maximise efficiency for the network. Many other types of controllable electric device may also be provided in a domestic or commercial setting.

Some electric devices in the network are not connected to the network controller 16 for direct control. Typically these are user operable devices, or devices that do not have flexibility in their timing of use, such as an industrial process.

In another example, a cooker in a domestic environment is designed to be used whenever it is convenient to the user; it would not be appropriate to delegate control of such a cooker to the network controller 16 operated by the electricity supply company. In yet another example, it would not be appropriate to delegate control of critical medical devices to the network controller 16 operated by the electricity supply company.

The network controller 16 is arranged as a server computer including processors and memory storage. Typically significant computational activity is undertaken by the network controller 16, and it may be efficient to distribute this processing among multiple processors, which may be arranged in separate computers.

An external data supplier 20 is provided to supply information to the network controller 16. Typically the external data supplier 20 provides real-time meteorological data and information on current events. These data may be used by the network controller 16 in calculating an energy budget.

Figure 2:
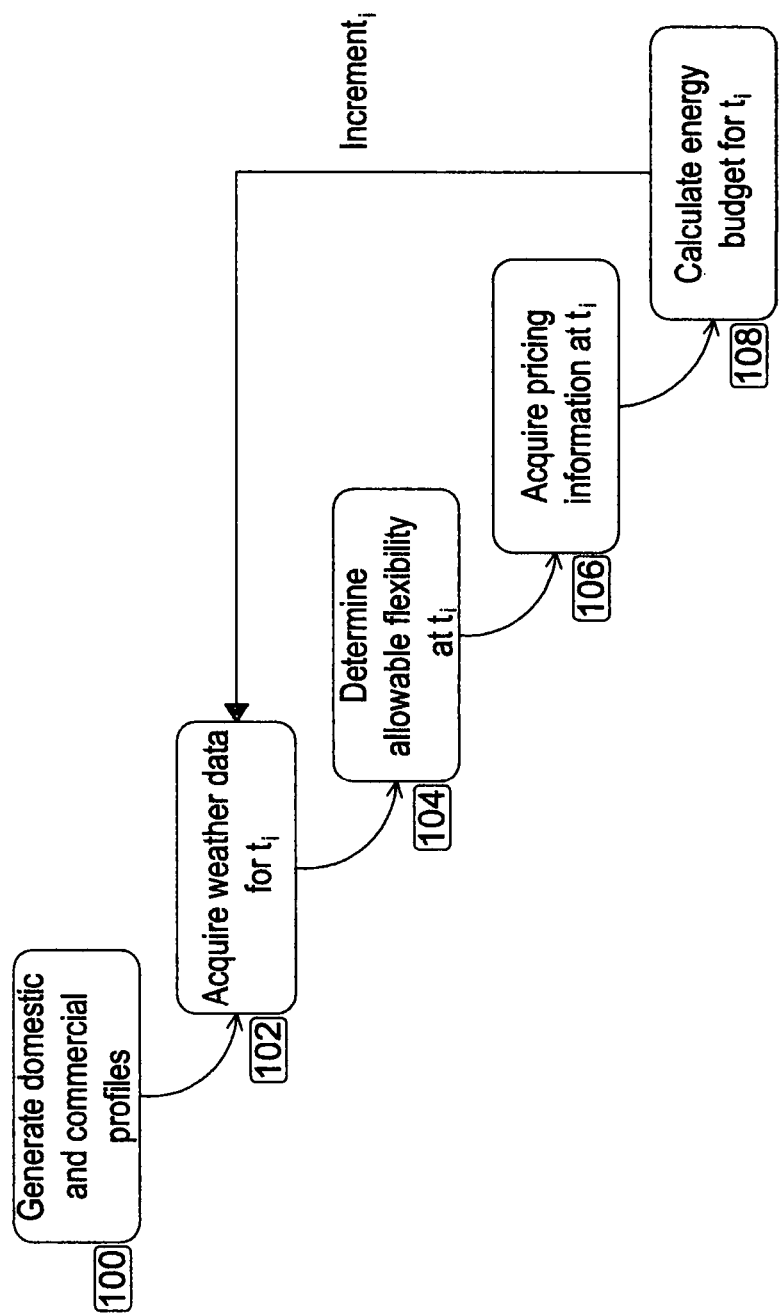
FIG. 2 is a flow diagram showing a process for setting a budget for an amount of electrical energy to be used in a settlement period, in an embodiment of the invention.

FIG. 2 is a flow diagram showing the steps that are undertaken by the network controller 16 in calculating a budget for the energy that is required in a settlement period. At step 100 the network controller 16 generates profiles for domestic and commercial customers 10, 12. Domestic customer profiles are created by monitoring electrical use over a period of two weeks. Commercial customer profiles are based on site visits or information from the commercial customers regarding their intended electrical use schedule. These profiles are used as a starting point for estimating the amount of electrical energy that will be required in a particular 30 minute settlement period.

At step 102 the network controller 16 acquires meteorological data from the external data supplier 20 for a specific 30 minute settlement period. External data such as meteorological data is important in the budget calculation process because it affects the amount of energy that is likely to be used by customers. In colder conditions, for instance, the amount of energy required will increase. The amount of energy required is also likely to be higher at the weekend or during holidays. Varied external factors are taken into account by the network controller 16 in calculating the energy budget.

At step 104 the network controller 16 determines the allowable flexibility in the controllable electrical devices in the network for a specific settlement period. The allowable flexibility is the difference in maximum and minimum possible energy consumption in the overlay web; in other words, it is the difference between switching all controllable devices on or off.

At step 106 the network controller 16 acquires a value indicative of the price of electricity in the specific settlement period. The price of electricity will typically vary depending on the market from which it is purchased based on the physical balance between electricity generation and consumption. The price of electricity is important because it will influence the desirability of turning on controllable electric devices. Where there is flexibility of operation it would normally be preferable to turn on controllable devices at night time when there are fewer demands on physical network infrastructure (and energy is cheaper). In contrast, it would normally be preferable to turn off controllable devices during peak periods. Turning devices off during peak periods reduces the carbon intensity of the grid mix.

At step 108 the network controller 16 calculates an appropriate energy budget for the network, taking into account the domestic and commercial profiles, external data such as meteorological data, allowable flexibility and pricing information. The energy budget is calculated to provide at least enough energy for a base level of demand, which is calculated based on the anticipated energy requirements of non-controllable electrical devices. The energy budget is also calculated to include enough additional energy for some controllable devices. Controllable devices will be factored into the energy budget in dependence on the price of electricity for the relevant time period as well as the flexibility of the given devices. Normally it is advantageous to set a higher energy budget for controllable electric devices during periods of cheaper electricity (usually at night time). Once an energy budget has been determined this is purchased in the market, and a figure for the energy budget is stored in local memory. Steps 102 to 108 are then repeated so that can energy budget is calculated for each half-hourly settlement period.

Figure 3:
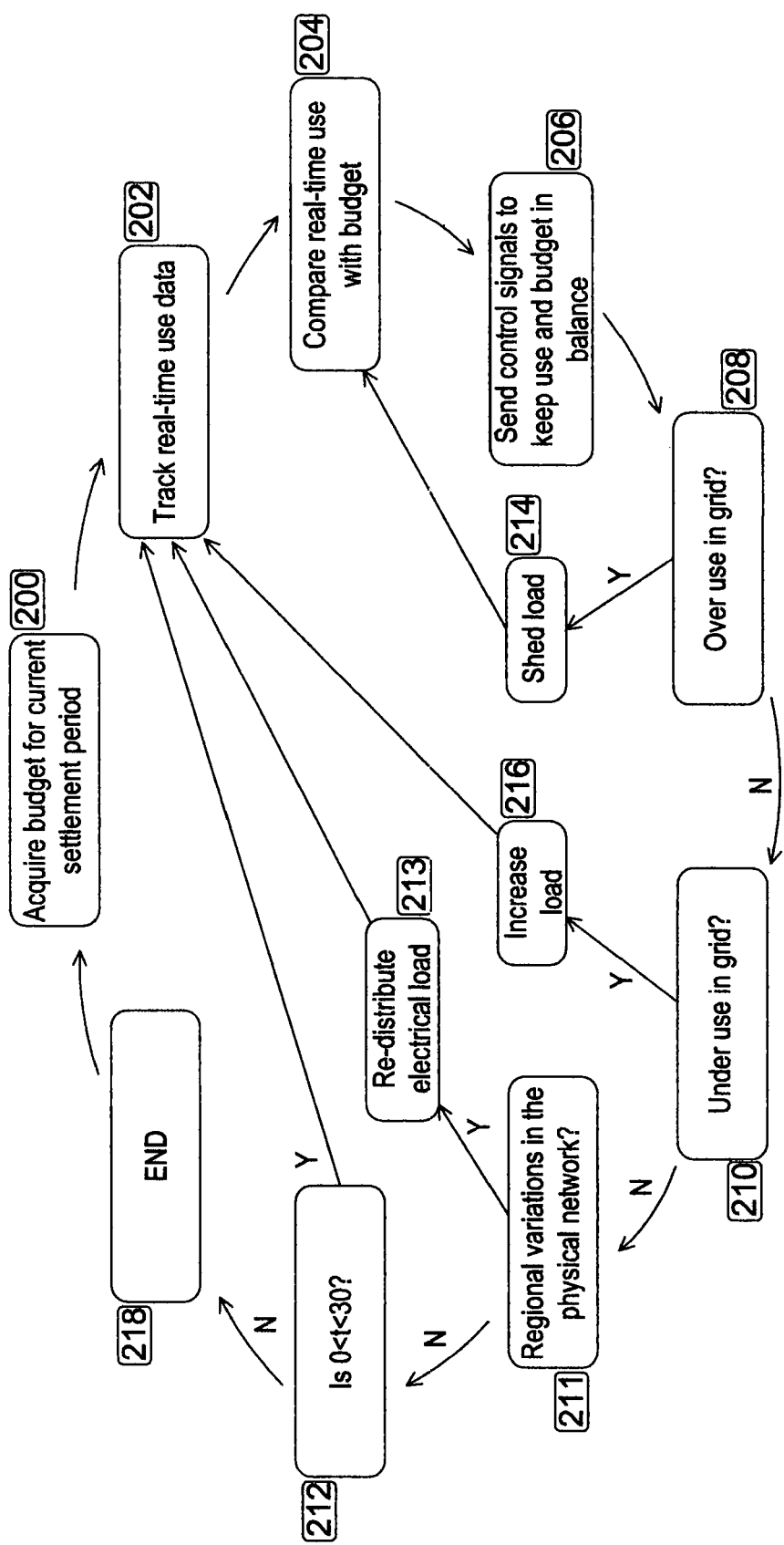
FIG. 3 is a flow diagram showing a process undertaken by the overlay network system in controlling electrical devices in a network, in an embodiment of the invention.

FIG. 3 is a flow diagram showing the steps that are undertaken by the network controller 16 in order to control electrical devices in the overlay web. At step 200 the network controller 16 acquires a budget for the current settlement period from local storage; this is the budget that has been calculated previously using the process shown in FIG. 2. At step 202 the network controller 16 tracks real-time use of electricity by domestic and commercial customers 10, 12 in the overlay web 22. This information is reported in real-time over communications networks by smart electricity meters 14. At step 204 the network controller 16 compares real-time use of electricity with the budget. Thus, the network controller 16 can determine in real time whether there has been an over-use or an under-use of electricity in the overlay web. If there is an over-use of electricity in comparison to the budget then at step 206 the network controller 16 sends direct control signals to appropriate controllable devices to instruct them to shed load. This reduces the energy use in the overlay web to bring total use of electricity back into balance with the electricity supply company's budget. In contrast, if there is an under-use of electricity in comparison to the budget then at step 206 the network controller 16 sends direct control signals to controllable devices instructing them to switch on and increase load. This is intended so that the cumulated use of energy in the overlay web is brought into balance with the budget at the end of the settlement period.

Figure 4A:
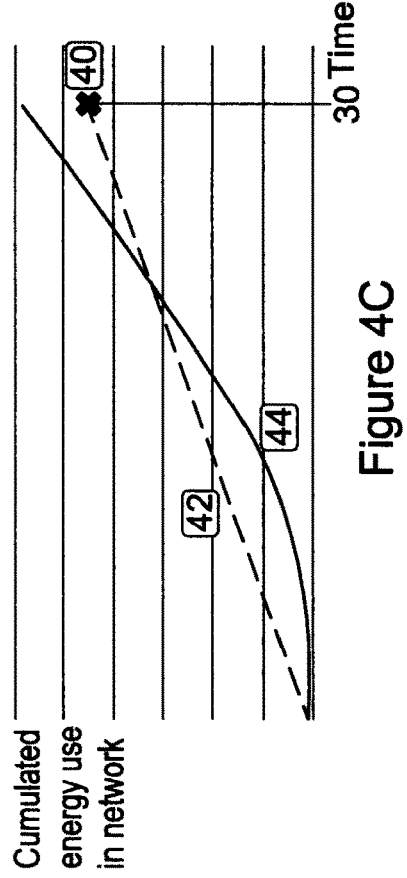
FIGS. 4A-4D are graphs of cumulated energy use in a network against time for different scenarios.

FIG. 4A is a graph showing the cumulated use of energy in the overlay web over time. A budget 40 is marked for a specific amount of electrical energy that has been purchased for use in a 30-minute settlement period. A dotted line 42 is shown to indicate a target rate of consumption of electricity that is desired to achieve a balance between the budget and the energy that has actually been used. A solid line 44 shows the actual consumption of electrical energy in the overlay web, as reported to the network controller 16 by smart electricity meters 14 in the premises of the domestic and commercial customers 10, 12. In this example it can be seen that the actual use of electrical energy in the overlay web initially exceeds the target rate of use. Thus, the gradient of the solid line 44 is initially higher than that of the dotted line 42. This imbalance is identified in the comparison step 204 and the network controller 16 is configured to take corrective action. In particular the network controller 16 sends a command at step 206 to one or more electrical devices, causing them to shed load. This reduces the rate of consumption of electricity in the overlay web so that the actual use is brought into balance with the budget. In this case it can be seen that the solid line 44 converges with the dotted line 42, and crosses it. After this point the cumulated energy use indicated by the solid line 44 is below the target indicated by the dotted line 42. Therefore, the network controller 16 again takes corrective action and instructs controllable electrical devices to increase load. This command causes the cumulated energy use to converge with the target indicated by the dotted line 42 so that the settlement period ends with the two in balance.

The controllable electrical devices in the overlay web 22 can be designated as 'slow' or 'fast'. 'Slow' devices are those for which there are comparatively long minimum periods between switch-on and switch-off commands. A slow device may be used in a manufacturing process that cannot be stopped after it has begun. An example of a fast device is an air conditioning unit that can turned on or off rapidly without causing damage to the unit.

The network controller 16 is also arranged such that it preferentially sends control signals to 'fast' electrical devices. This is preferable because the network controller 16 can easily reverse instructions to fast electrical devices if the balance between actual use and the target changes. This can be seen in FIG. 4A where there was initially an over-use, followed by an underuse of energy. On the other hand, it may not be possible to reverse a command to a 'slow' electrical device within the settlement period. Therefore, signals to these devices are sent preferentially in the second half of the period when it is less likely that natural events would bring use back into balance with the budget.

The network controller 16 is arranged so that it generates different kinds of control signals during first and second halves of the settlement period. Control signals are sent by the network controller 16 only if a predetermined threshold is exceeded in the comparison of step 204. In the first half of the settlement period a higher threshold applies. Thus, the network controller 16 tends to avoid sending command signals initially in order to avoid interference in the overlay web. Early interference in the web is generally undesirable because it is possible that natural influences could correct an early imbalance. In the second half of the settlement period a lower threshold applies because it is more important that the energy use is in balance with the budget at the end of the settlement period than at any instantaneous moment beforehand.

At step 208 the network controller 16 analyses conditions in the physical network 8 to determine whether there is an over-use of electricity in the physical network. An over-use of energy in the physical network 8 is a potentially serious problem because it could result in power outages and/or damage to infrastructure. Such an over-use may be detected in various physical network parameters such as real-time price or physical network frequency. A reliable indicator is actually the real-time price of the commodity because a rapid increase in price usually indicates that resources are limited. In these circumstances the network controller 16 can instruct controllable electric devices in the overlay web 22 to shed load in order to reduce the burden on the network; this corresponds to step 214. In these circumstances the network controller 16 can send a 'shed load' command independently of the result of the comparison in step 204. Thus, even if the overlay web 22 has used less energy than anticipated, the network controller 16 can still instruct devices to shed load. It has been found that this can have a positive overall effect for the physical network 8, even though it may increase the likelihood of an imbalance for the specific network operated by the utility company. Such an imbalance is not normally desirable, but it could become desirable in exceptional conditions when the physical network 8 is under an intense load. This has a number of positive environmental impacts. First, it reduces the need to increase the amount of power in the physical network, which reduces carbon emissions. Second, it reduces the demand on infrastructure such as power lines, which reduces the risk of failure and power outages.

Figure 4B:
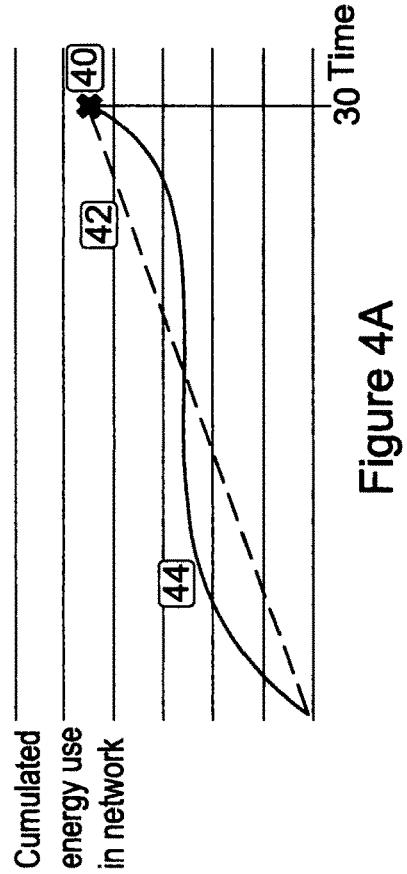

FIG. 4B is another graph showing the cumulated use of energy in the web over time. A budget 40 is marked for a specific amount of electrical energy that has been purchased for use in a 30-minute settlement period. A dotted line 42 is shown to indicate a target rate of consumption that would achieve a balance between the budget and the energy that has actually been used. In this example an over-use condition is detected in the physical network 8 at step 208. At this point the network controller 16 instructs all controllable devices to shed load. In addition, the network controller 16 instructs the batteries 18 to discharge electricity to the physical network 8. The rate of electricity consumed in the overlay web 22 then decreases sharply such that there is an imbalance between the budget and the amount of energy used at the end of the settlement period.

At step 210 the network controller 16 analyses conditions in the physical network 8 to determine whether there is an under-use of electricity. An under-use of electricity is also a potentially serious problem in the physical network 8, and therefore the network controller 16 can instruct devices to increase their load in order to reduce the burden on the physical network 8. An under-use of electricity can be detected by analysing real-time price and/or physical network frequency. In some countries negative pricing is activated where there is an under-use of electricity in the physical network, and this can be detected.

An under-use of electricity may be caused by a sudden increase in the proportion of energy in the physical network generated by renewable sources. This could be caused by a particularly sunny day causing high levels of solar energy and/or high winds leading to large amounts of wind energy. By increasing the load in the overlay web 22 it is possible to take advantage of these renewable sources of energy. If this energy were not used then it may otherwise have been wasted. Therefore, there are important environmental advantages inherent in these techniques.

Figure 4C:
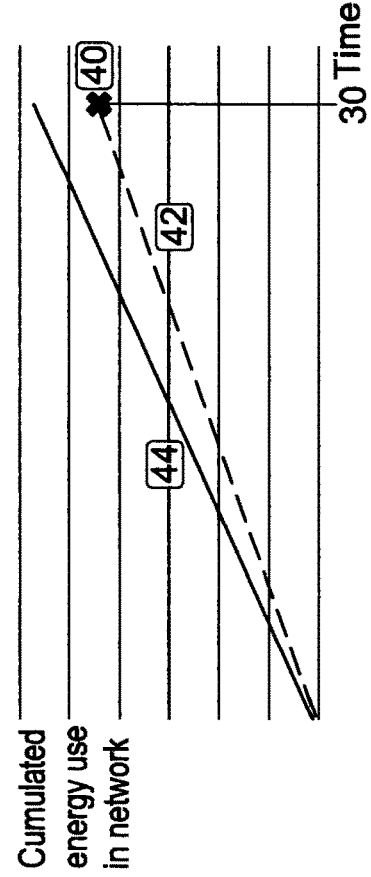

FIG. 4C is another graph showing the cumulated use of energy in the overlay web over time. In this example an under-use condition is detected in the overlay web 22 at step 210. In these circumstances the network controller 16 sends an instruction to all controllable devices in the web, causing them to increase load. The network controller 16 also instructs the batteries 18 to charge from the physical network 8. The rate of electricity consumed in the overlay web 22 then increases sharply such that there is an imbalance between the budget and the amount of energy used at the end of the settlement period.

At step 211 the network controller 16 analyses regional variations in the physical network 8 to determine whether it would be desirable to re-distribute electrical load in a country. In the United Kingdom there are thirteen regional zones in which management of the physical network 8 is undertaken. Each zone sets its own charges for the supply of electricity using the physical network 8, which may be dependent on local physical conditions. Typically the charges between zones are different, which is reflective of different physical conditions in the network 8 in different regions. Examples of physical conditions that may influence the charges include local capacity in the physical network 8, the amount of electricity generated in the local area and local weather conditions. The network controller 16 acquires data from each zone in order to compare relative supply charges. In one example the supply charges for North Scotland and the South Scotland may be as follows:

| Region Time period Cost | | |
|---|---|---|
| North Scotland | | |
| RED: | 16:00-19:00 | 10.606p per kW |
| AMBER: | 07:00-16:00 and19:00-23:00 | 0.265p per kW |
| GREEN: | 23:00-07:00 | 0.05p per kW |

-continued

| Region | Time period | Cost |
|---|---|---|
| South Scotland | | |
| RED: | 16:30-19:00 | 11.02p per kW |
| AMBER: | 07:00-16:30 and 19:00-22:00 | 0.301p per kW |
| GREEN: | 22:00-07:00 | 0.04p per kW |

These charges are acquired by the network controller 16 at step 211 and compared. In this hypothetical example the RED time period supply charges are usually higher in South Scotland, but during a short period from 16:00 to 16:30 the charges are lower in South Scotland, because it applies AMBER pricing in this time period. The network controller 16 may determine that electrical load should be preferentially increased in South Scotland in comparison to North Scotland from 16:00 to 16:30. In these circumstances the network controller 16 may send control signals to various electrical devices in the different regions at step 213 in order to re-distribute electrical load. Similar considerations are made in other time periods. For example, during common AMBER time periods the supply charges are higher in South Scotland, which means that the network controller 16 may determine that electrical load should be preferentially shed in South Scotland and preferentially increased in North Scotland during this period to the benefit of the physical network 8. The network controller 16 may implement any conclusions at step 213 by instructing electrical devices in the different regions to shed or increase load. This effectively redistributes electrical load in the physical network. This can be advantageous to the physical network 8 because regional variations in price are typically indicative of variations in physical capacity and availability of infrastructure in different regions.

In the above example only two geographic regions are referenced. In reality the network controller 16 acquires data from each of the zones in a country and redistributes electrical load, as necessary to ease pressure on the physical network 8, while still balancing total electrical use with the budget.

At step 212 the current time is compared with the 30-minute settlement period. If the current time is within the settlement period then the process is returned to step 202, and the steps continue in a loop. At the end of the settlement period the process ends at step 218. The process then returns to step 200 and a new budget is acquired for the next settlement period.

These charges are acquired by the network controller 16 at step 211 and compared. In this hypothetical example the RED time period supply charges are usually higher in South Scotland, but during a short period from 16:00 to 16:30 the charges are lower in South Scotland, because it applies AMBER pricing in this time period.

The network controller 16 may determine that

Figure 4D:
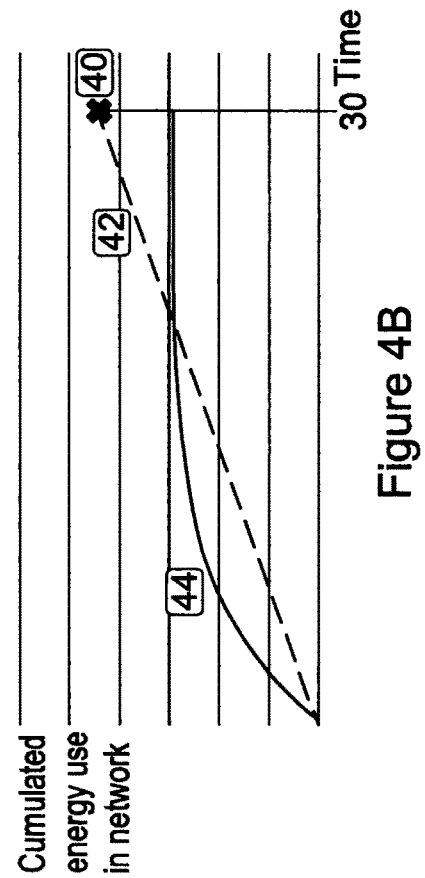

As discussed, it is normally desirable for the amount of energy used to be in balance with the energy budget at the end of the settlement period. However, this is not always possible and an example of such a situation is now described with reference to FIG. 4D which is another graph showing the cumulated use of energy in the overlay web over time. In this example there are no over-use or under-use conditions detected in the physical network 8 at steps 208 or 210. Instead, the amount of energy used in the overlay web 22 is consistently above target, and therefore the network controller 16 instructs controllable devices to shed load. In this example the network controller 16 fails to achieve balance with the energy budget because there is not enough flexibility to achieve this with the controllable devices, even though maximum load is being shed.

The calculation of optimal control signals at step 206 is computationally intensive, and therefore it may not be efficient or possible to complete these in real-time. In one embodiment the computations are performed in advance for all possible circumstances. The closest match can then be selected from a look-up table in real time.

Figure 5:
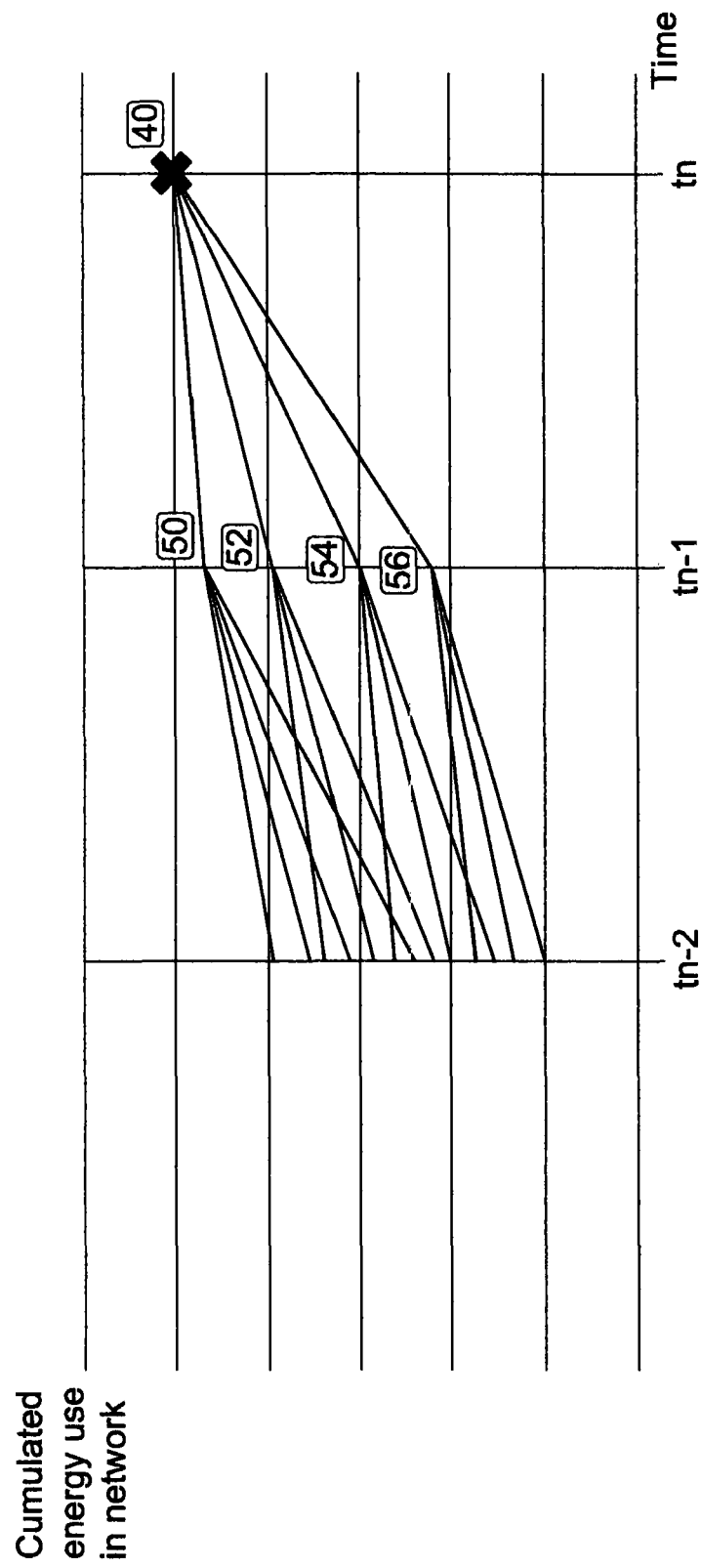
FIG. 5 is a graph illustrating the approach taken by the network controller in calculating control signals for the controllable electrical devices at MCSWSM.
Figure 6:
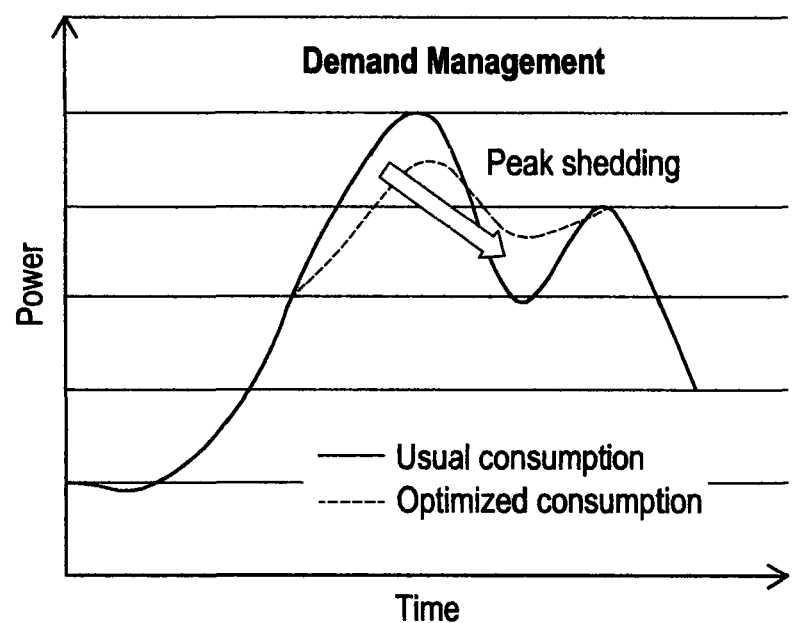
FIG. 6 illustrates one benefit of the invention.

FIG. 5 is a graph illustrating the approach taken by the network controller in calculating control signals for the controllable electrical devices. In this example a control decision is taken by the network controller 16 at regular intervals; in a preferred embodiment the decision interval is 3 minutes. The network controller 16 is configured to work backwards from the end of the settlement period (tn) calculating the effect of all possible control signals. Specifically, the network controller 16 calculates the control signals that would be required in the preceding time interval in order to achieve balance between the energy budget and the energy used. In this example four lines are shown corresponding to respective control signals 50, 52, 54, 56. In reality, of course, a very large number of possible control decisions would be possible, but only four are shown for presentational simplicity. The four lines 50, 52, 54, 56 represent control signals that, if implemented at tn-1, would bring the energy used into balance with the energy budget at the end of the settlement period, tn. For each possible control signal 50, 52, 54, 56, a further set of possible control signals are calculate to propagate backwards in time to tn-2. This calculation process then continues for all possible decision points and the network controller 16 stores this information in a look-up table in memory. Once all calculations have been completed it is possible to trace a theoretical path from any point to the target budget, using specific control decisions. Therefore, it is possible to select an appropriate control signal in real-time simply by noting the current time and the current cumulated electrical energy and referencing the look-up table.

It will be appreciated that whilst an embodiment of the invention is described hereinbefore, a number of modifications and alterations may be made thereto without departing from the scope of the invention as defined by the appended claims.

The invention claimed is:

1. A method of controlling electrical devices at a plurality of customer sites, each customer site having separate metering of electricity use at that customer site, the method facilitating control over the consumption of electricity in an overlay electricity supply web made up of electrical demands from all of the customer sites that is overlaid on a physical network, comprising the steps of: acquiring a budget for electrical energy use in a predetermined time period at the customer sites; monitoring real-time use of electrical energy by electrical devices in the overlay web; comparing real-time use of electrical energy at the customer sites with the budget; and sending a control signal to at least one electrical device at at least one of the customer sites in the overlay web, based on the comparison, in order to increase or decrease the total electrical load of all of the customer sites so that total energy use at all of the customer sites in the predetermined time period is balanced with the budget;

monitoring at least one real-time parameter related to the amount of excess energy in the physical network;

determining whether the at least one real-time parameter exhibits predefined characteristics indicative of under use of electrical energy in the physical network; and sending a control signal to at least one of the electrical devices in the overlay web made up of multiple electricity using customers in order to increase electrical load if there is an indication of under use of electrical energy.

2. The method of claim 1, wherein each customer site has one or more devices with known electrical loads, the method comprising a step of selecting which device(s) to switch on/off at the said at least one of the customer sites in the overlay web.

3. The method of claim 1 comprising the steps of: monitoring at least one real-time parameter related to the amount of excess energy in the physical network; determining whether the at least one parameter exhibits predefined characteristics indicative of over use of electrical energy in the physical network; and sending a control signal to at least one electrical device in the overlay web in order to reduce electrical load on the physical network if there is an indication of over use of electrical energy.

4. The method of claim 1 wherein a plurality of electrical devices are controlled based on the real-time use of electrical energy by devices in the overlay web, and wherein each electrical device has a permitted flexibility in the timing of its use.

5. The method of claim 1 wherein each of the plurality of electrical devices has an assigned maximum allowable control frequency, and wherein control signals are sent to those of the electrical devices having a lower assigned maximum control frequency in a later portion of the predetermined time period than electrical devices having a higher assigned maximum control frequency.

6. The method of claim 1 wherein control signals are sent in a later portion of the predetermined time period in comparison to in an earlier portion of the predetermined time period.

7. The method of claim 1 wherein the predetermined time period is divided in at least two portions and different rules for sending control signals are applied in the respective portions.

8. The method of claim 1 wherein control signals are sent to a plurality of electrical devices, at least of which is an electrical storage device, wherein the electrical storage device can receive a control signal in order to increase or decrease electrical load.

9. The method of claim 1 wherein electricity meters are provided for monitoring real-time use of electrical energy, and data are reported in real-time.

10. The method of claim 1 wherein acquiring the budget involves calculating an anticipated amount of electrical energy required in the overlay web in the predetermined time period based on consumption data for users of the overlay web.

11. The method of claim 9 wherein the calculation of the anticipated amount of electrical energy required in the overlay web made up of multiple electricity using customers in the predetermined time period is also based on one or more of: weather, user location, temperature, date, and a calendar of significant events.

12. The method of claim 9 wherein the calculation of the anticipated amount of electrical energy required in the web in the predetermined time period is also based on the permitted flexibility of use of electrical devices in the overlay web together with the price of electricity in the predetermined time period.

13. The method of claim 9 further comprising the step of calculating an uncertainty factor for the anticipated amount of electrical energy required in the overlay web in the predetermined time period.

14. The method of claim 1 further comprising the step of analyzing at least one property of the physical network in a plurality of geographic zones and selecting a geographic zone where the at least one property has a value falling within a predetermined range, wherein the step of sending the control signal involves sending the control signal to at least one electrical device in the selected geographic zone.

15. The method of claim 13 comprising the step of sending control signals in order to decrease electrical load in one geographic zone and increase electrical load in another geographic zone.

16. An apparatus for controlling electrical devices at multiple customer sites with separate metering in an electricity supply web made up of multiple electricity using customers that is overlaid on a physical network, comprising:
a hardware processor configured to acquire a budget for electrical energy for use in a predetermined time period;
a receiver configured to receive data relating to the real-time use of electrical energy by electrical devices in the overlay web, wherein the processor is configured to compare real-time use of electrical energy with the budget; and
a transmitter configured to send a control signal to at least one electrical device in the overlay web, based on the comparison, in order to increase or decrease electrical load so that total energy use in the predetermined time period is balanced with the budget;
the processor being configured to monitor at least one real-time parameter related to the amount of excess energy in the physical network, to determine whether the at least one real-time parameter exhibits predefined characteristics indicative of under use of electrical energy in the physical network, and to cause the transmitter to send a control signal to at least one of the electrical devices in the overlay web made up of multiple electricity using customers in order to increase electrical load if there is an indication of under use of electrical energy.

17. A non-transitory computer readable storage medium having a computer program stored thereon, the computer program comprising processor readable instructions that, when executed, direct a device to perform actions comprising:
acquiring a budget for electrical energy for use in an electricity supply web made up of multiple electricity using customers that is overlaid on a physical network in a predetermined time period;
monitoring real-time use of electrical energy by electrical devices in the overlay web; comparing real-time use of electrical energy with the budget; and
sending a control signal to at least one electrical device in the overlay web, based on the comparison, in order to increase or decrease electrical load so that total energy use in the predetermined time period is balanced with the budget for the benefit of all the customers in the electricity supply web;
monitoring at least one real-time parameter related to the amount of excess energy in the physical network;
determining whether the at least one real-time parameter exhibits predefined characteristics indicative of under use of electrical energy in the physical network; and sending a control signal to at least one of the electrical devices in the overlay web made up of multiple electricity using customers in order to increase electrical load if there is an indication of under use of electrical energy.

* * * * *